(12) United States Patent
Hirokami et al.

(10) Patent No.: US 10,203,034 B2
(45) Date of Patent: Feb. 12, 2019

(54) OUTPUT CONTROL SYSTEM

(71) Applicant: Kawasaki Jukogyo Kabushiki Kaisha, Kobe-shi, Hyogo (JP)

(72) Inventors: Tatsuya Hirokami, Osaka (JP); Shohei Terai, Akashi (JP); Seiji Azuma, Kako-gun (JP); Kengo Ueda, Akashi (JP)

(73) Assignee: KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 364 days.

(21) Appl. No.: 15/288,727

(22) Filed: Oct. 7, 2016

(65) Prior Publication Data

US 2017/0102070 A1 Apr. 13, 2017

(30) Foreign Application Priority Data

Oct. 7, 2015 (JP) .................. 2015-199420

(51) Int. Cl.

| | |
|---|---|
| *F16H 63/50* | (2006.01) |
| *B60K 17/02* | (2006.01) |
| *F02D 37/02* | (2006.01) |
| *B60K 17/08* | (2006.01) |
| *F02D 41/00* | (2006.01) |

(Continued)

(52) U.S. Cl.
CPC ............ *F16H 63/50* (2013.01); *B60K 17/02* (2013.01); *B60K 17/08* (2013.01); *B60W 30/18027* (2013.01); *F02D 11/105* (2013.01); *F02D 31/001* (2013.01); *F02D 37/02* (2013.01); *F02D 41/0002* (2013.01); *F02D 41/021* (2013.01); *F02D 41/022* (2013.01); *F02D 41/0225* (2013.01)

(58) Field of Classification Search
None
See application file for complete search history.

(56) References Cited

U.S. PATENT DOCUMENTS

| 6,554,091 B2* | 4/2003 | Mianzo .................. B60K 28/16 123/350 |
| 7,393,307 B2* | 7/2008 | Hozuki ............... F02D 41/0225 477/121 |

(Continued)

FOREIGN PATENT DOCUMENTS

JP 2013002383 A 1/2013

*Primary Examiner* — Colby M Hansen
(74) *Attorney, Agent, or Firm* — Alleman Hall Creasman & Tuttle LLP

(57) ABSTRACT

An output control system incorporated in a vehicle including a clutch device which shifts a drive system from a no-load state to a connected state, comprises an upper limit setting section which sets an upper limit value of an output of the drive source while the output control system is performing a starting control; and a state determiner section which determines a state of the drive system while the output control system is performing a starting control, the upper limit setting section sets the upper limit value to a first upper limit value, while the state determiner section is determining that the drive system is in the no-load state, and the upper limit setting section sets the upper limit value to a second upper limit value larger than the first upper limit value, when the state determiner section determines that the connected state of the drive system is initiated.

7 Claims, 6 Drawing Sheets

(51) Int. Cl.
*B60W 30/18* (2012.01)
*F02D 41/02* (2006.01)
*F02D 11/10* (2006.01)
*F02D 31/00* (2006.01)

(56) References Cited

U.S. PATENT DOCUMENTS

2006/0240945 A1\* 10/2006 Tanaka ................. B60W 10/06
  477/111
2007/0293368 A1\* 12/2007 Tamai ................. F02D 41/0205
  477/107

\* cited by examiner

OUTPUT CONTROL SYSTEM

CROSS-REFERENCE TO THE RELATED APPLICATION

This application claims priority to and the benefit of Japanese Patent Application No. 2015-199420 filed on Oct. 7, 2015, the entire disclosure of which is incorporated herein by reference.

BACKGROUND OF THE INVENTION

Field of the Invention

The present invention relates to an output control system incorporated in a vehicle including a clutch device which connects and cuts off a driving power transmission path provided between a drive source and a drive wheel.

Description of the Related Art

A control system disclosed in JP2013-002383A sets a target engine speed to a first target value while a clutch is disengaged before a vehicle is started. At a time point when the clutch begins to slip, the control system sets the target engine speed to a second target value smaller than the first target value.

When the second target value is smaller than the first target value, there is a possibility that the engine speed is decreased excessively just after the clutch has begun to slip, depending on a traveling situation, for example, in a case where an engine inertia is low, a case where a resistance applied from a ground surface is high, or a case where a reduction gear ratio is high.

In view of the above-described circumstances, an object of the present invention is to suppress a decrease in a rotational speed of a drive source which occurs just after a clutch has begun to slip, while a vehicle is started.

SUMMARY OF THE INVENTION

According to an aspect of the present invention, an output control system incorporated in a vehicle including a clutch device which shifts a drive system from a no-load state in which a driving power transmission path provided between a drive source and a drive wheel is cut off to a connected state in which the driving power transmission path is connected, comprises: an upper limit setting section which sets an upper limit value of an output of the drive source while the output control system is performing a starting control; and a state determiner section which determines a state of the drive system while the output control system is performing the starting control, wherein the upper limit setting section sets the upper limit value to a first upper limit value, while the state determiner section is determining that the drive system is in the no-load state, and wherein the upper limit setting section sets the upper limit value to a second upper limit value larger than the first upper limit value, when the state determiner section determines that the connected state of the drive system is initiated.

In accordance with this configuration, since the upper limit value is set in the output of the drive source while the starting control is performed, it becomes easy for a vehicle to be started with a relatively high output, when an output command input by a rider is great. Since the upper limit value of the output is set to be higher when the connected state of the drive system is initiated than before the connected state of the drive system is initiated, it becomes possible to suppress a decrease in the output or a decrease in the rotational speed, due to generation of a load applied to the drive source.

The state determiner section may determine that the connected state of the drive system is initiated, when a reduction amount of a rotational speed of the drive source per unit time becomes equal to or greater than a first predetermined value, in a state in which the output of the drive source is maintained within a first upper limit range including the first upper limit value.

In accordance with this configuration, in a case where the rider incorrectly operates a clutch operation unit and thereby the clutch is engaged rapidly, it can be determined whether or not the driving power generated in the drive source begins to be transmitted to the drive wheel, before the state determiner section detects a vehicle speed and starting of the vehicle. This makes it possible to suppress a reduction of the output at a time point when the vehicle can move at a vehicle speed with the driving power transmitted to the drive wheel.

The state determiner section may determine that the connected state of the drive system is initiated, when the reduction amount of the output of the drive source per unit time is equal to or greater than the first predetermined value, and a reduction amount of an output command per unit time is less than a second predetermined value, the output command being input by a rider.

In accordance with this configuration, even in a situation in which the output of the drive source is reduced although the rider provides a command for maintaining the output of the drive source, it can be determined that this situation is the initiation of transmission of the driving power, before the state determiner section detects the vehicle speed and starting of the vehicle.

The upper limit setting section may substantially cease to set the upper limit value, when the state determiner section determines that a vehicle speed becomes one corresponding to the second upper limit value in a state in which the clutch device is engaged.

In accordance with this configuration, since limiting of the output of the drive source is ceased, when the clutch device becomes engaged, the vehicle can be accelerated with the output demanded by the rider.

The clutch device may be configured to change a ratio of the driving power transmitted to the drive wheel with respect to the driving power transmitted from the drive source, and the upper limit setting section may maintain the upper limit value at the second upper limit value until the ratio becomes a predetermined maximum ratio.

In accordance with this configuration, since the rotational speed of the drive source is maintained at the rotational speed (second upper limit value) at which a desired output as the output characteristic of the drive source can be obtained, the rider may perform an operation to engage the clutch at a suitable timing (e.g., the vehicle speed reaches one corresponding to the second upper limit value). This allows the rider to focus on a clutch operation.

The output control system comprises a transmission included in the driving power transmission path, and the upper limit setting section may cease to set the second upper limit value, when a gear position of the transmission is other than a lowest gear position.

The drive source may be an engine, and the clutch device may be configured to change a ratio of the driving power transmitted to the drive wheel with respect to the driving power transmitted from the engine, and an amount of intake air to be supplied to the engine may be controlled according to the ratio.

In accordance with this configuration, since the air-intake amount is controlled, the output of the drive source can be suppressed smoothly.

The above and further objects, features and advantages of the present invention will more fully be apparent from the following detailed description of preferred embodiment with accompanying drawings.

DETAILED DESCRIPTION OF THE EMBODIMENTS

Hereinafter, the embodiment of the present invention will be described with reference to the drawings. The directions stated below are from the perspective of a rider in a vehicle. A vehicle length direction conforms to a forward and rearward direction, and a vehicle width direction conforms to a rightward and leftward direction.

[Vehicle]

Figure 1:
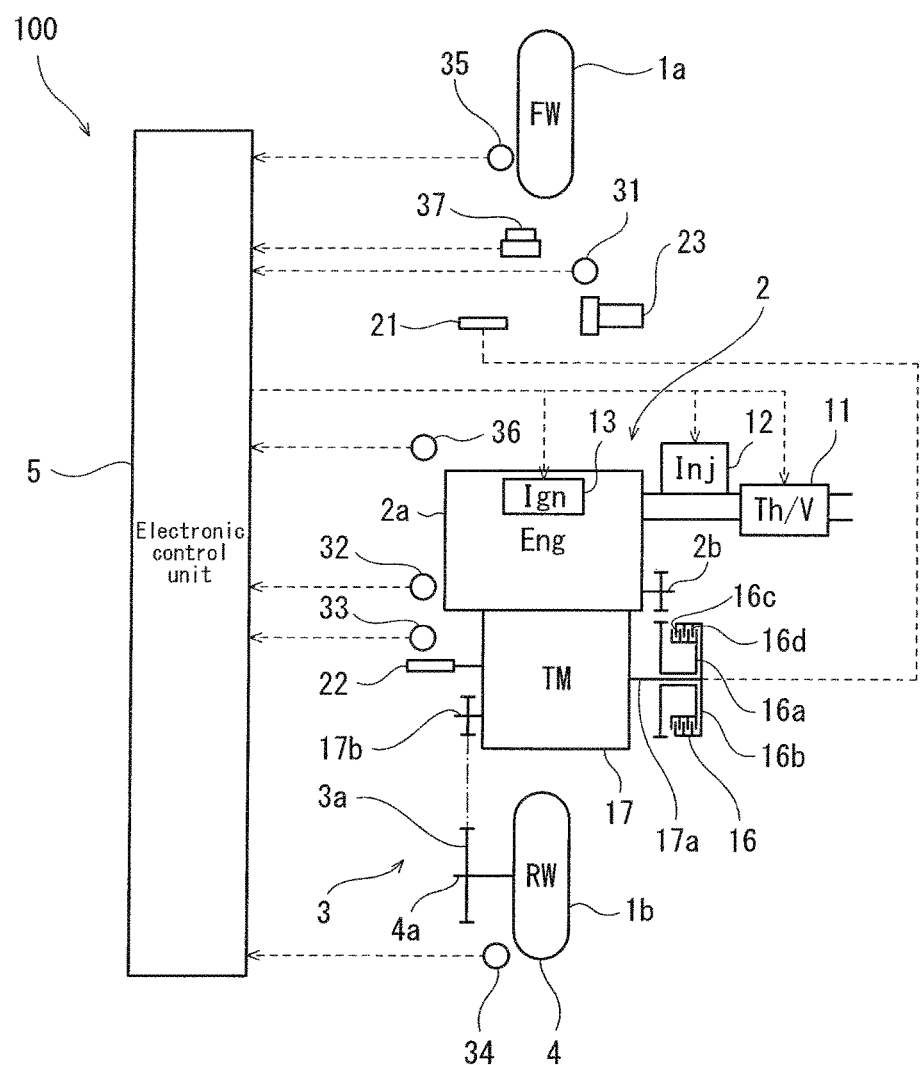
FIG. 1 is a schematic diagram showing the configuration of a drive system and an output control system according to the embodiment, which are mounted in a vehicle.
Figure 2:
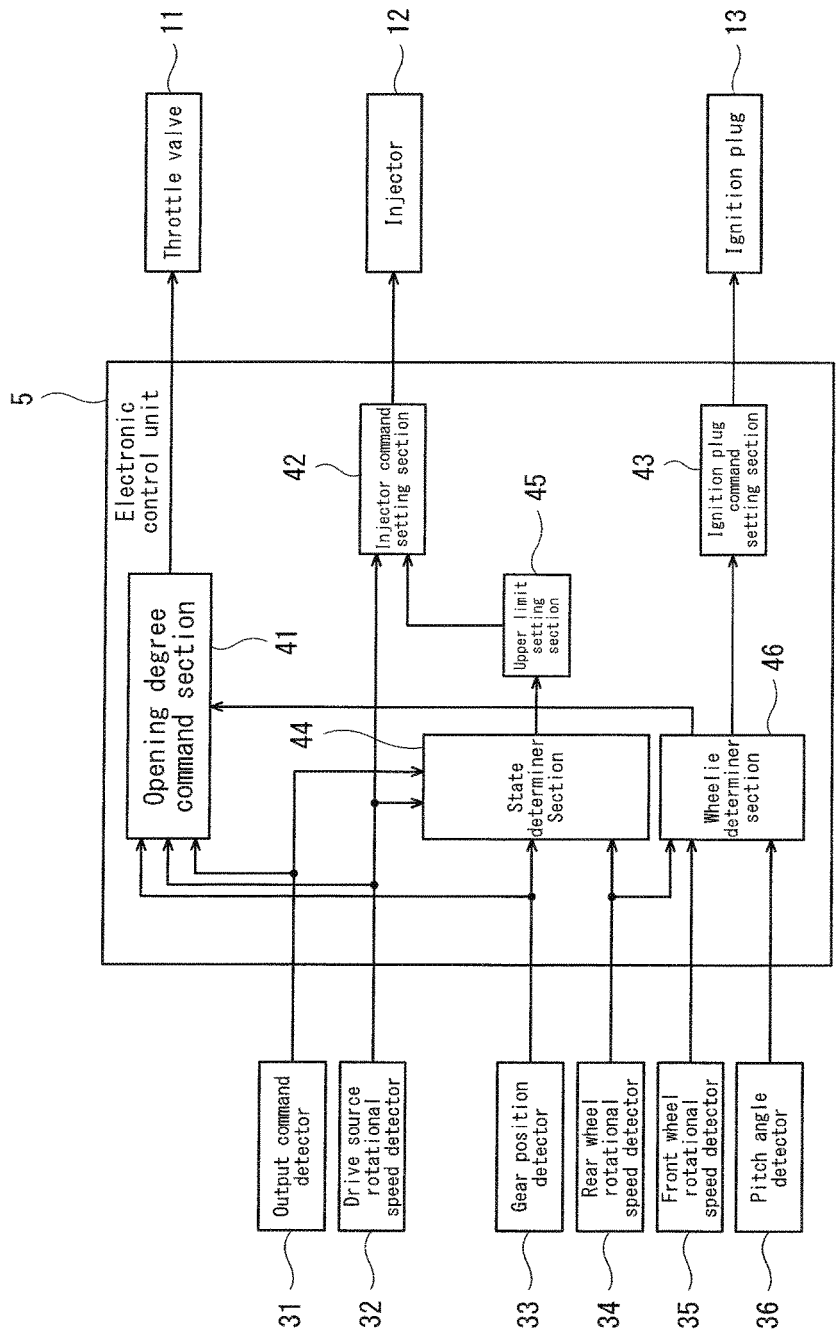
FIG. 2 is a block diagram showing the configuration of the output control system.

FIG. 1 shows a drive system and an output control system 100 which are mounted in a vehicle. The vehicle includes at least one front wheel 1a, at least one rear wheel 1b, a drive source 2, and a driving power transmission mechanism 3. The drive source 2 is an engine, an electric motor, or a combination of the engine and the electric motor. Driving power generated by the drive source 2 is transmitted to a drive wheel 4 via a driving power transmission path 3a formed by the driving power transmission mechanism 3. For example, the vehicle is a motorcycle (two-wheeled motor vehicle) including one front wheel 1a and one rear wheel 1b, the drive source 2 is an engine 2a, the front wheel 1a is a driven wheel, and the rear wheel 1b is the drive wheel 4.

The engine 2a is provided with a throttle valve 11, an injector 12, and an ignition plug 13. The opening degree of the throttle valve 11 is changeable. With a change in the opening degree of the throttle valve 11, the amount of intake air supplied to the engine 2a changes. The injector 12 injects fuel. The ignition plug 13 generates a spark in the interior of a combustion chamber and ignites an air-fuel mixture. In a case where the engine 2a includes a plurality of cylinders, the injector 12 and the ignition plug 13 are provided for each of the plurality of cylinders.

The driving power transmission mechanism 3 is disposed between the drive source 2 and the drive wheel 4, and includes a clutch device 16 and a transmission 17. The clutch device 16 is disposed on the driving power transmission path 3a at a location that is upstream of the transmission 17 (closer to the drive source 2 than the transmission 17 is). An output shaft 2b of the drive source 2 is coupled to an input element 16a of the clutch device 16. An output element 16b of the clutch device 16 is coupled to a transmission input shaft 17a of the transmission 17. A transmission output shaft 17b of the transmission 17 is coupled to an axle 4a of the drive wheel 4. These members are coupled to each other in a constant manner. In contrast, the driving power transmission path 3a may be cut off between the input and output elements 16a, 16b of the clutch device 16, and between the input and output shafts 17a, 17b of the transmission 17.

The clutch device 16 is, for example, a friction clutch device. The clutch device 16 transmits the driving power with a friction force generated between a friction section 16c of the input element 16a and a friction section 16d of the output element 16b. The vehicle is provided with a clutch operation unit 21 (e.g., clutch lever) which is manually operated by the rider to adjust a crimping load working between the friction sections 16c, 16d. In an unoperated state in which the clutch operation unit 21 is at an original position, a biasing force is applied so that one of the friction sections 16c, 16d is pressed against and secured to the other. This biasing force is cancelled by an operation force input to the clutch operation unit 21 by the rider. The crimping load is reduced by the operation force.

When the operation force applied to cancel the biasing force is input to the clutch operation unit 21 by the rider, the crimping load becomes zero, so that the friction sections 16a, 16d move away from each other. The clutch device 16 is disengaged, and in this state, the driving power is not transmitted between the input and output elements 16a, 16b. Therefore, the driving power transmission path 3a is cut off, and the drive source 2 is disconnected from the drive wheel 4. Hereinafter, this state will be referred to as "no-load state".

In this state, when the operation force input to the clutch operation unit 21 is decreased and the operation position of the clutch operation unit 21 is returned a little toward the original position, the friction sections 16c, 16d are brought into contact with each other. Thereby, the friction force begins to be generated between the friction sections 16c, 16d. The driving power corresponding to the friction force is transmitted between the input and output elements 16a, 16b. With a decrease in the operation force, the crimping load is increased, and the amount of the driving power which can be transmitted to the drive wheel 4 is increased. At this time, the clutch device 16 is in a slip state, in which one of the friction sections 16c, 16d is slipping and rotating with respect to the other. When the operation position of the clutch operation unit 21 is returned to the original position and the operation force becomes zero, a maximum crimping load works, which causes the clutch device 16 to be engaged. In the engaged state, maximum driving power which is permitted in the clutch device 16 can be transmitted, and the friction sections 16c, 16d can be rotated at an equal speed. Hereinafter, a state in which the driving power of the drive source 2 can be transmitted to the drive wheel 4 will be referred to as "connected state".

As described above, the clutch operation unit 21 is operated by the rider to shift the clutch device 16 among the disengaged state, the slip state, and the engaged state, to shift the drive system from the no-load state to the connected state or from the connected state to the no-load state. The clutch device 16 is configured to continuously change a ratio (hereinafter this will be referred to as a driving power transmission ratio) of the driving power transmitted to the drive wheel 4 (e.g., the transmission input shaft 17a) with respect to the driving power transmitted from the drive source 2. The driving power transmission ratio is minimum (0%) in the disengaged state of the clutch device 16 and maximum (100%) in the engaged state of the clutch device 16. It should be noted that the clutch device 16 is not limited to the friction clutch device.

The type of the transmission 17 is not particularly limited. A manual multi-stage transmission which requires a clutch operation for shifting the gear position may be suitably used as the transmission 17. In that case, the vehicle is provided with a gearshift operation unit 22 (e.g., gearshift pedal) which is manually operated to select one from among a plurality of gear positions of the transmission 17. Although the term "gear" is exemplarily used for the sake of convenience, the transmission 17 need not be a transmission of a gear type. Gear positions include at least a neutral position and two or more forward traveling positions. When the neutral position is selected, the driving power transmission path 3a is cut off between the input and output shafts 17a, 17b. In contrast, when one of the forward traveling positions is selected, the driving power transmission path 3a is formed to connect the input and output shafts 17a, 17b, and a transmission gear ratio becomes a value corresponding to the selected gear position. As the forward traveling position is lower, the transmission gear ratio becomes higher, and forward traveling torque to be transmitted to the rear wheel 1b is increased. Hereinafter, a state of the transmission 17 in which the gear position is the neutral position will be referred to as a "gear-out" state, and a state of the transmission 17 in which the gear position is one of the forward traveling positions will be referred to as a "gear-in" state.

The state of the drive system may include a concept made in view of the state of the transmission 17. In that case, in a situation in which the transmission 17 is in the gear-in state and the clutch device 16 is slipping or engaged, the drive system is connected. In contrast, in other situations (e.g., the clutch device 16 is disengaged or the transmission device 17 is in the gear-out state), the drive system is in the no-load state.

[Output Control System]

The output control system 100 according to the present embodiment is incorporated in the vehicle including the above-described drive system. The output control system 100 includes detectors 31 to 36 which detect information required to control the output of the drive source 2, an electronic control unit (ECU) 5 as a controller (a processing unit and a memory unit), and the throttle valve 11, the injector 12, and the ignition plug 13 which are operation devices.

The vehicle includes an output operation unit 23 (e.g., an accelerator grip) which is manually operated by the rider to input an output command. An operation position of the output operation unit 23 indicates the output command. An output command detector 31 (e.g., an accelerator position sensor) detects the output command and outputs a detection value of the output command to the ECU 5.

In addition to the above-described detectors, the ECU 5 may be connected to a drive source rotational speed detector 32 which detects the rotational speed of the drive source 2, a gear position detector 33 which detects the gear position of the transmission 17, a rear wheel (drive wheel) rotational speed detector 34 which detects the rotational speed of the rear wheel 1b, and a front wheel rotational speed detector 35 which detects the rotational speed of the front wheel 1a. Further, the ECU 5 may be connected to a throttle valve position detector (not shown) which detects a throttle valve opening degree (rotational position of a valve element of the throttle valve 11).

The opening degree of the throttle valve 11 is electronically controlled by the ECU 5. Although not shown in the drawings in detail, the throttle valve 11 includes the valve element which is rotatable within an air-intake passage, and a valve actuator (e.g., electric motor) which rotates the valve element. The ECU 5 derives a target value of the throttle valve opening degree in response to the output command received as an input from the output command detector 31, and drives the valve actuator so that the throttle valve opening degree reaches the target value.

In a case where the vehicle is the motorcycle, a wheelie tends to occur in such a manner that the front wheel 1a lifts off the ground, depending on the number of wheels, a magnitude of the output with respect to a vehicle weight, a short length of a wheel base, or the like. While this wheelie is occurring, the vehicle body pitches and a pitch angle of the vehicle body changes. The "pitch" refers to a rotational motion around a virtual rotational axis in the vehicle width direction. The ECU 5 is also connected to a pitch angle detector 36 which detects the pitch angle of the vehicle body. The pitch angle detector 36 may be a sensor which detects a pitch angular velocity or a pitch angular acceleration. Alternatively, the ECU 5 may derive the pitch angle by integrating the detection values of these sensors.

The ECU 5 receives as inputs information indicative of the driving states of the vehicle from the detectors 31 to 36. Based on the received information, the ECU 5 drives the throttle valve 11, the injector 12, and the ignition plug 13, and controls the throttle valve opening degree, a fuel injection amount (injector opening period), an ignition timing, a fuel reducing ratio, and an ignition reducing ratio, to control the rotational speed and output of the drive source 2. The fuel reducing ratio is defined as a ratio of the number of strokes at which fuel injection is not performed with respect to the number of times of successive explosion strokes as a unit. The ignition reducing ratio is defined as a ratio of the number of strokes at which the ignition plug 13 does not generate a spark with respect to the number of times of the successive explosion strokes as the unit.

The ECU 5 contains therein a plurality of traveling modes such as a normal traveling mode, a starting mode which enables the vehicle to be started rapidly, and a power mode which enables the vehicle to travel with maximum torque of the drive source 2 after the vehicle has been started. Depending on a scene in which the vehicle travels, or the rider's driving skill, one of the plurality of traveling modes is selected automatically by the ECU 5 or manually by the rider. For example, in a case where the vehicle travels on a circuit, the starting mode is suitably used. Even under the condition in which each of the detection values of the detectors 31 to 36 is equal, the target value of the throttle valve opening degree, the fuel injection amount or the ignition timing is changed, depending on the selected driving mode. In this way, the output of the drive source 2 can be controlled depending on the scene in which the vehicle travels, or the rider's driving skill.

Based on the selected traveling mode, and the information indicating the driving state which is input, the opening degree command section 41 decides the target value of the throttle valve opening degree, and controls the throttle valve 11 so that the throttle valve opening degree reaches the target value. In the same manner, the injector command setting section 42 decides the target value of the fuel injection amount and controls the injector 12 so that the fuel injection amount reaches the target value. The ignition plug command setting section 43 decides the target value of the ignition timing and controls the ignition plug 13 so that the ignition timing reaches the target value.

Figure 3:
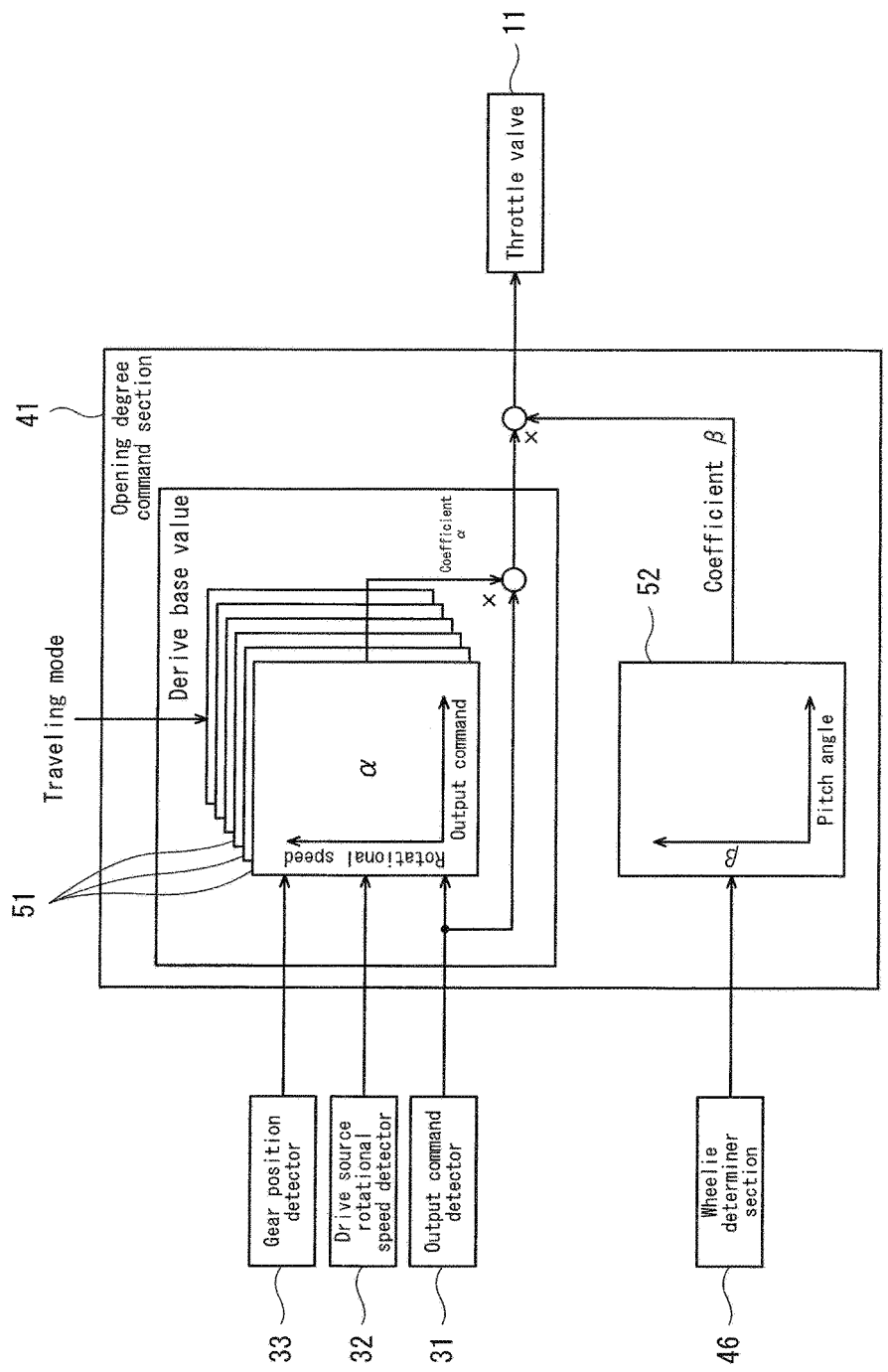
FIG. 3 is a block diagram showing the configuration of an opening degree command section.

As shown in FIG. 3, for example, regarding the throttle valve opening degree, the output command (namely, the operation position of the output operation unit 23) detected by the output command detector 31 is set as a primary base value of the target value. This primary base value has a linear correlation with the output command. The primary base value is compensated by a characteristic conversion coefficient α derived with reference to one of characteristic conversion maps 51. The maps 51 are created to correspond to the plurality of traveling modes and the plurality of gear positions, respectively, and pre-stored in the ECU 5. Each of the maps 51 defines a relation between the output command and the rotational speed, and the coefficient α. The opening degree command section 41 selects one of the plurality of maps 51, depending on the traveling mode and the gear position. With reference to the selected map 51, the opening degree command section 41 derives the coefficient α corresponding to the output command received from the output command detector 31 and the rotational speed received from the drive source rotational speed detector 32. The opening degree command section 41 multiplies the primary base value by the derived coefficient α, and sets the resulting multiplication value as a secondary base value of the target value. In the above-described manner, the throttle valve opening degree is basically controlled to become proportional to the output command. In addition, the throttle valve opening degree is compensated to be adapted to the gear position, the engine speed, and the traveling mode.

In some traveling situations, it is desirable to suppress the output of the drive source 2 in a particular manner. For example, these traveling situations typically include a case where the drive wheel 4 is slipping and the vehicle has lost a traction function, and a case where the wheelie is occurring. These traveling situations occur irrespective of which of the traveling modes is selected. When such a traveling situation is detected, the opening degree command section 41 compensates the base value (in particular, the secondary base value obtained by compensating the primary base value using the coefficient α in view of the traveling mode or the like), by an opening degree limiting coefficient β, to reduce the target value. In this way, the output of the drive source 2 can be suppressed at a suitable time, which makes it possible to avoid occurrence of the slip or the wheelie, or to end the slip or the wheelie at an early stage. The opening degree limiting coefficient β is derived by a different method according to the traveling situation. For example, the coefficient β used to suppress the wheelie is set according to the pitch angle or the like. The coefficient β used to suppress the wheelie is set according to a slip ratio or a change amount of the slip ratio, although detailed description thereof is omitted.

[Starting Mode]

Hereinafter, a starting control performed by the output control system 100 in the starting mode will be described. To perform the starting control, the ECU 5 includes a state determiner section 44 and an upper limit setting section 45. As described above, the starting mode is set in view of the fact that the starting mode is used during starting in the circuit racing. The state determiner section 44 detects the state of the drive system and other driving states. The upper limit setting section 45 sets the upper limit value of the output of the drive source 2 based on the detected driving states. Under this setting, the ECU 5 operates the drive source 2 in a driving range in which the maximum torque is generated. Further, the ECU 5 includes a wheelie determiner section 46 which determines whether or not the wheelie is occurring in the vehicle, while the starting control is performed.

The output control system 100 includes a permission/inhibition switch 37 (see FIG. 1) which is manually operated by the rider. The rider manually operates the permission/inhibition switch 37, to provide to the ECU 5 a command indicative of permission or inhibition of the starting control. Hereinafter, a basic flow of the starting control will be described.

(Start of Starting Control/No-load State)

Figure 4:
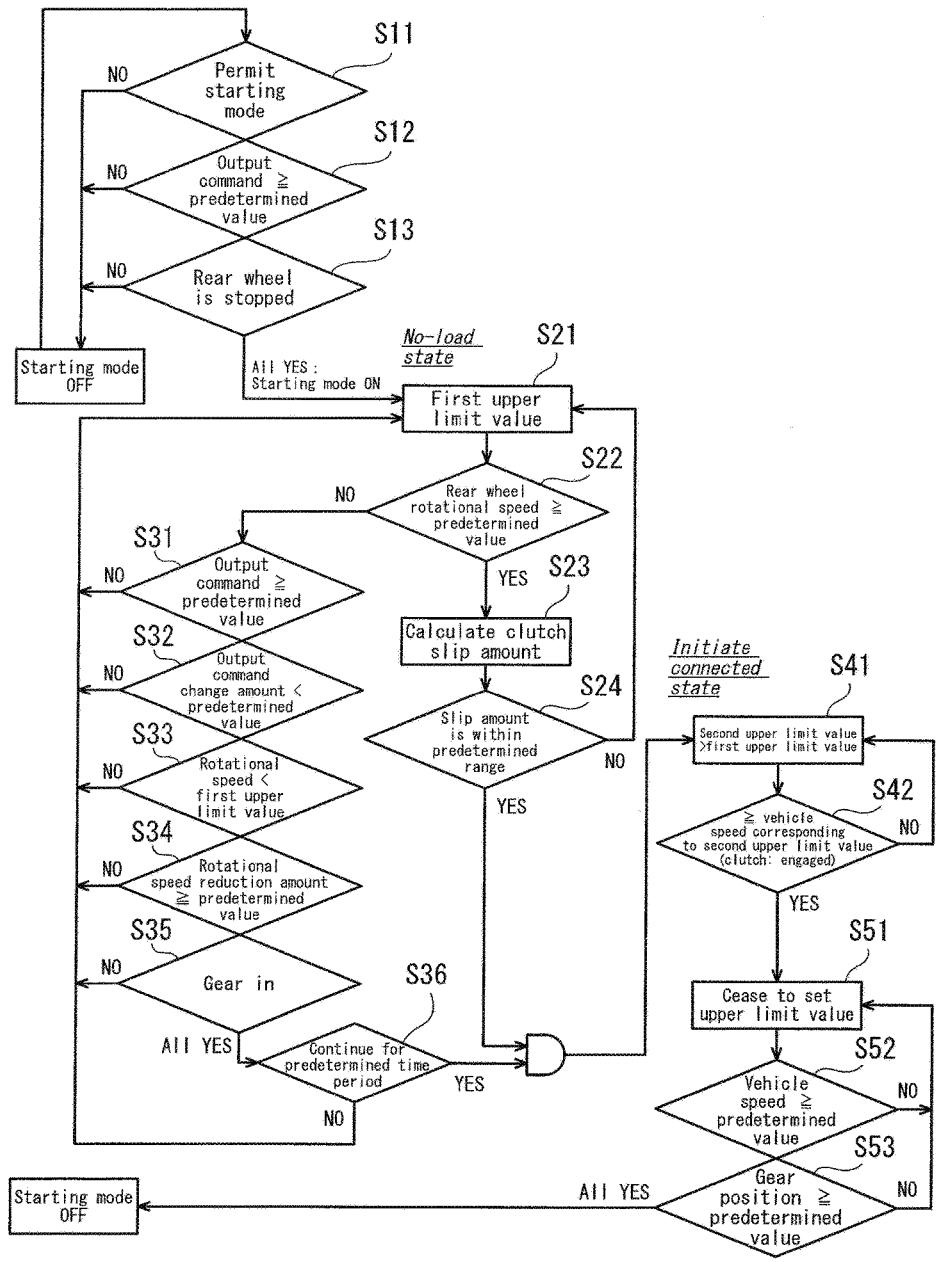
FIG. 4 is a flowchart showing a starting control performed by the output control system.

As shown in FIG. 4, when the state determiner section 44 determines that the permission command of the starting control is output from the permission/inhibition switch 37 to the ECU 5 (S11), the output command is equal to or greater than a predetermined value (S12), and the drive wheel 4 is in a stopped state (not moving) (S13), the output control system 100 initiates the starting control. In the present embodiment, the predetermined value to be compared to the output command is close to a value indicating the fully open state of the accelerator (namely, maximum value). The fact that the output command is close to the maximum value and the drive wheel 4 continues to be in the stopped state means that the drive system is in the no-load state. At the time point of initiation of the starting control, the state determiner section 44 determines that the drive system is in the no-load state.

The drive system has already been in the no-load state before the state determiner section 44 determines that the drive system is in the no-load state. Just before the starting control is initiated, the traveling mode is set to, for example, the normal traveling mode, and the target value of the throttle valve opening degree is decided with reference to the characteristic conversion map 51 for the normal traveling mode. Under this situation, the output operation unit 23 is operated to place the accelerator in a substantially fully open position. Since the drive system is in the no-load state, it is highly likely that the rotational speed of the drive source 2 reaches a value that is close to a predetermined excess rotation limit value (over rev limiter) set to protect the drive source 2. The output control system 100 controls the ignition timing, the fuel reducing ratio and/or the ignition reducing ratio to control the operation of the injector 12 and/or the operation of the ignition plug 13, in order to prevent the rotational speed from exceeding the excess rotation limit value.

Figure 6:
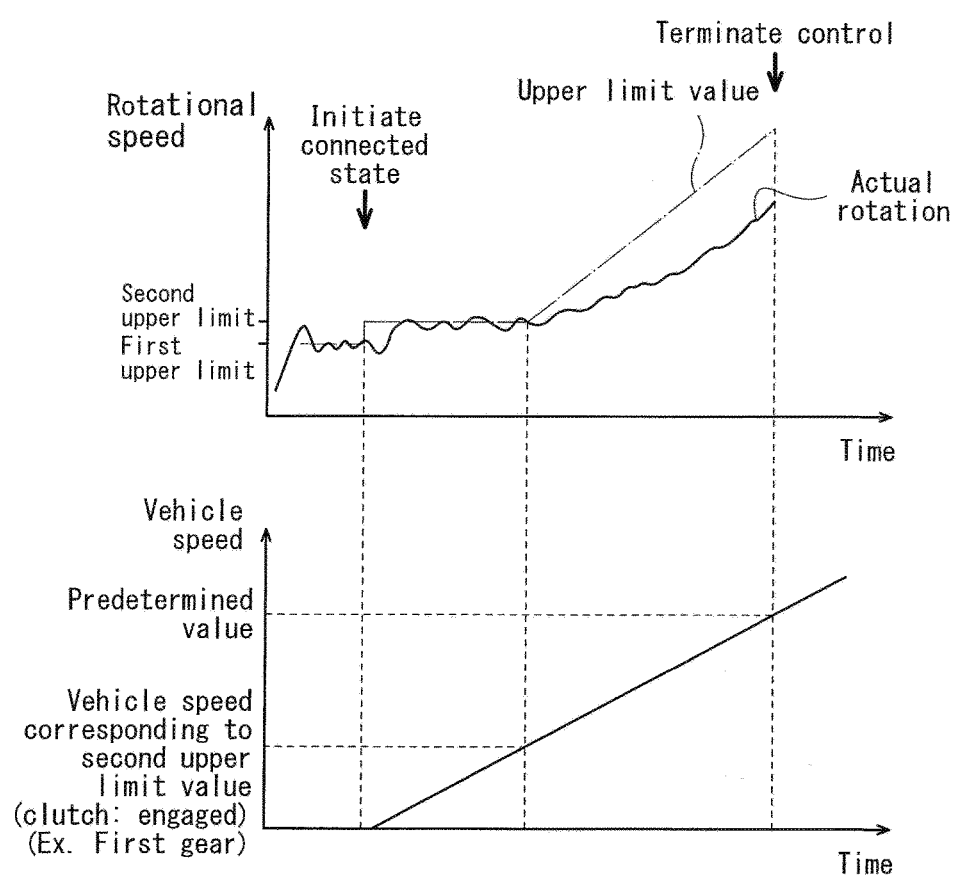
FIG. 6 is a chart showing an example of changes over time, of the rotational speed of a drive source and the like, during the starting control.

While the state determiner section 44 is determining that the drive system is in the no-load state after the starting control has been initiated, the output control system 100 sets the upper limit value of the output of the drive source 2 to a first predetermined upper limit value (S21). In this case, the "output" may be a product of the rotational speed of the drive source 2 and the torque of the drive source 2, the rotational speed, or the torque. In the present embodiment, it is supposed that the rotational speed of the drive source 2 is used as the "output", unless otherwise noted. The same applies to a second predetermined upper limit value which will be describe later. In this case, the first upper limit value is set to a value smaller than the excess rotation limit value, for example, about 8000 rpm. An exemplary change in the rotational speed of the drive source 2 during the starting control is shown in FIG. 6.

Quick response is required to set the rotational speed of the drive source 2 to a statically determinate value. However, a delay tends to occur in air-intake control. By limiting the rotational speed by an operation for ceasing a combustion, such as an operation for reducing the fuel or an operation for reducing the number of times of the ignition, the quick response can be realized, and the revving up of the rotational speed is unlikely to occur, which is desirable. In the present embodiment, when the upper limit value is set to the first upper limit value, the injector command setting section 42 decides the fuel injection amount and the fuel reducing ratio so that the rotational speed reaches the first upper limit value, and drives the injector 12. This makes it easy for the rotational speed to quickly approach the first upper limit value. Also, it becomes possible to easily set the rotational speed to a statically determinate value that is close to the first upper limit value.

Figure 5:
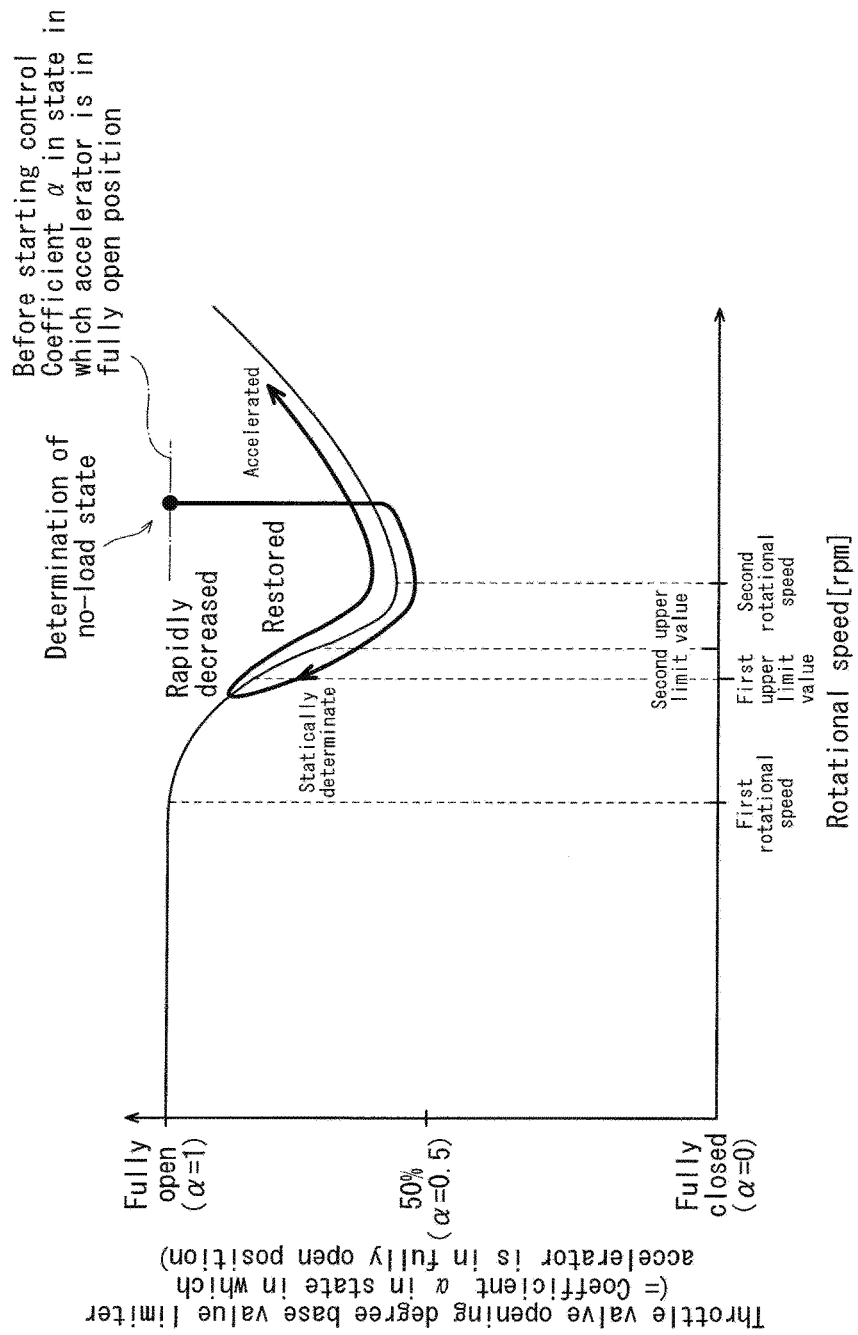
FIG. 5 is a graph showing limiting of a throttle valve opening degree during the starting control.

FIG. 5 is a graph showing a limitation imposed on the throttle valve opening degree during the starting control. During the starting control, the opening degree command section 41 derives the coefficient α with reference to the characteristic conversion map 51 for the starting mode, and derives the secondary base value of the target value of the throttle valve opening degree. During stand-by for the starting, the throttle valve opening degree is not compensated by use of the coefficient β, and the product (secondary base value) of the output command and the coefficient α becomes a final target value. The graph of FIG. 5 shows what limit value the final target value (secondary base value) should be set according to the rotational speed. As described above, the coefficient α is decided based on the output command and the rotational speed. In another perspective, the coefficient α is obtained by dividing the limit value (as the final target value) by the output command. Therefore, it may be said that what value the coefficient α should be set according to the rotational speed of the drive source 2, in a case where it is assumed that the output command indicates that the accelerator is in the fully open position. If the output command is less than the limit value, the coefficient α is 1, the final target value matches the output command, and the final target value is not limited. This allows the rider to adjust an air-intake amount even when the starting mode is selected.

A trend of the graph will be explained. In a range from an idle rotational speed (e.g., about 1000 rpm) to a first rotational speed, the final target value is not limited (α=1 in the state in which the accelerator is in the fully open position). In a range between the first rotational speed and a second rotational speed higher than the first rotational speed, the final target value is limited more with an increase in the rotational speed (α decreases from 1 in the state in which the accelerator is in the fully open position). At the second rotational speed, the final target value is limited most. With an increase in the rotational speed from the second rotational speed, the final target value is limited less (α increases in the state in which the accelerator is in the fully open position). The first upper limit value is set to a value between the first rotational speed and the second rotational speed. A limit value corresponding to the first upper limit value is less than the opening degree of the throttle valve in the fully open position. In brief, just after the starting mode has been initiated, the throttle valve opening degree is limited to the value which is less than the opening degree of the throttle valve in the fully open position, even in the state in which the accelerator is in the fully open position.

The characteristic conversion map 51 is shifted upon the initiation of the starting control, and thereby the throttle valve opening degree which was close to that in the fully open position according to the traveling mode before the starting control is initiated is decreased rapidly. As a result, the rotational speed is decreased quickly and approaches the first upper limit value. Concurrently, the injector command setting section 42 finely adjusts the fuel injection amount and the fuel reducing ratio, and thereby the rotational speed is maintained within a range including the first upper limit value, namely, the first upper limit range as a numeric value range centered at the first upper limit value, in the present embodiment. Note that the first upper limit range is set to a range which is equal to or less than the excess rotation limit value. Since the air intake amount is limited, the rotational speed can be finely adjusted more easily than in a case where the throttle valve opening degree is the opening degree in the fully open position. Since the output of the drive source 2 at the starting is adjusted by using the air-intake control and the combustion control in combination, the rotational speed can be limited while maintaining a target air-fuel ratio.

(Determination of Initiation of Connected State)

Turning back to FIG. 4, while the state determiner section 44 is determining that the drive system is in the no-load state, the output control system 100 determines whether or not the drive system has shifted from the no-load state to the connected state and the connected state is initiated. In principle, when the clutch device 16 is shifted from the disengaged state to the slip state, the connected state of the drive system is initiated. As a result, the driving power is transmitted to the drive wheel 4 and the rotation of the drive wheel 4 and starting of the vehicle are initiated. At a time point when the drive wheel 4 begins to rotate, the clutch device 16 is required to be in the slip state. If not, an impact or a stall is induced, due to a great rotational speed difference between the output shaft 2b of the drive source 2 and the drive wheel 4, or the wheelie is induced due to the fact that an excessively high output is transmitted abruptly to the drive wheel 4. To avoid such a situation, the rider is required to operate the clutch operation unit 21 so that that the rotational speed of the drive wheel 4 tracks the rotational speed of the output shaft 2b of the drive source 2 while the rider is returning the operation position of the clutch operation unit 21 toward the original position, namely, a slip amount of the clutch device 16 (clutch slip amount) is reduced, and the clutch device 16 becomes the engaged state at a time point when the rotational speed of the drive wheel 4 reaches the rotational speed of the output shaft 2b of the drive source 2.

While the state determiner section 44 is determining that the drive system is in the no-load state, it determines whether or not the rotational speed of the drive wheel 4 (the rear wheel 1b) is equal to or higher than a predetermined value (S22). When the state determiner section 44 determines that the rotational speed of the drive wheel 4 is equal to or higher than the predetermined value, it calculates the clutch slip amount (S23).

To calculate the clutch slip amount, the state determiner section 44 measures an input rotational speed which is the rotational speed of the input element 16a or the rotational speed of a rotary member which is located upstream of the input element 16a on the driving power transmission path 3a, and an output rotational speed which is the rotational speed of the output element 16b or the rotational speed of a rotary member which is located downstream of the output element 16b on the driving power transmission path 3a. The clutch slip amount is calculated by multiplying the output rotational speed by a speed ratio of a measurement target member of the input rotational speed with respect to a measurement target member of the output rotational speed, and by subtracting the resulting multiplication value from the input rotational speed. For example, the measurement target member of the input rotational speed is the output shaft 2b of the drive source 2, while the measurement target member of the output rotational speed is the drive wheel 4. In that case, the speed ratio by which the output rotational speed is to be multiplied includes a transmission gear ratio of the transmission 17, and therefore, the speed ratio is derived in view of the gear position. Specifically, the clutch slip amount is calculated with reference to the detection value of the drive source rotational speed detector 32, the detection value of the rear wheel rotational speed detector 34, and the detection value of the gear position detector 33.

Then, the state determiner section 44 determines whether or not the calculated clutch slip amount falls within a predetermined range (S24). When the state determiner section 44 determines that the calculated clutch slip amount falls within the predetermined range, it determines that the clutch device 16 is in the engaged state, and the process goes to step S41.

So long as the clutch operation is performed appropriately at appropriate time by the rider, the state determiner section 44 can determine that the connected state of the drive system is initiated based on the clutch slip amount after the drive wheel 4 begins to rotate. However, if the clutch operation is rapidly performed and the crimping load in the clutch device 16 is rapidly increased, a load applied to the drive source 2 is increased and the rotational speed of the drive source 2 is decreased, before the driving power is transmitted to the drive wheel 4. In this case, the connected state of the drive system has already been initiated at a time point when the drive wheel 4 begins to rotate. The clutch slip amount cannot be calculated unless the drive wheel 4 begins to rotate. Therefore, in the above-described determination method, when the connected state of the drive system is initiated before the drive wheel 4 begins to rotate, detection of the initiation of the connected state is retarded. For this detection time lag, a state in which the rotational speed is low continues. To avoid this, the state determiner section 44 is configured to also determine the initiation of the connected state of the drive system before the drive wheel 4 begins to rotate.

Specifically, if the rotational speed of the drive wheel 4 is lower than the predetermined value, while the state determiner section 44 is determining that the drive system is in the no-load state, the state determiner section 44 determines whether or not a plurality of conditions are met. The plurality of conditions are a condition in which the output command is equal to greater than a predetermined value (S31), a condition in which a change amount of the output command per unit time is less than a predetermined value (S32), a condition in which the output (rotational speed) is lower than the first upper limit value (S33), a reduction amount of the output (rotational speed) per unit time is equal to or greater than a predetermined value (the reduction amount is positive in a case where the output is decreased, and the predetermined value is positive) (S34), and a condition in which the transmission 17 is in the gear-in state (S35). The state determiner section 44 determines whether or not these conditions S31 to S35 continue to be met for a predetermined time period (e.g., several hundred milliseconds) (S36). When the state determiner section 44 determines that these conditions S31 to S35 continue to be met for the predetermined time period, it determines that the connected state of the drive system is initiated.

Now, a relation between the above-described conditions and the states of the drive system will be described. If the clutch operation unit 21 begins to be returned to the original position in the gear-in state even while the rotational speed of the drive source 2 is controlled to fall into the first upper limit range and become close to the first upper limit value, the friction force generated between the friction sections 16c, 16d, and a resistance of the output element 16b and the following members of the driving power transmission mechanism 3, which are to be rotated by the friction force, become a load to the drive source 2. Due to this load, the rotational speed of the drive source 2 is decreased. In other words, contact between the friction sections 16c, 16d of the clutch device 16 becomes a disturbance to a constant value control for the rotational speed. In view of this, during the no-load state, the output control system 100 monitors a change in the rotational speed due to the disturbance, while performing the constant value control of the rotational speed. By detecting a decrease in the rotational speed, the state determiner section 44 determines that the connected state of the drive system is initiated.

The condition S35 is an essential condition for allowing the drive system to be in the connected state in a case where the state of the drive system includes the state of the transmission 17. The conditions S31 to S34 constitute another essential condition, namely, a condition in which the clutch device 16 has exited from the disengaged state while the output command is maintained at the predetermined value or more. By taking the conditions S31 to S34 (in particular, S33, S34) as well as the condition S35 into account, it can be detected that the rotational speed is decreased from the first upper limit value in the gear-in state, namely, the connected state of the drive system is initiated.

If the clutch slip amount falls into the predetermined range, or the condition S36 is met, while the state determiner section 44 is determining that the drive system is in the no-load state, the state determiner section 44 determines that the clutch device 16 has become the engaged state. The state determiner section 44 may determine whether or not the conditions S31 to S36 are met in a case where the rotational speed of the drive wheel 4 is equal to or higher than the predetermined value. In that case, steps S22 to S24 and steps S31 to 36 are performed concurrently.

(After Initiation of Connected State)

When the state determiner section 44 determines that the connected state of the drive system is initiated, the output control system 100 sets the upper limit value of the output to the second upper limit value (e.g., 8500 rpm) greater than the first upper limit value (S41). At a time point when the state determiner section 44 determines that the connected state of the drive system is initiated, the rotational speed is being decreased, and is lower than the first upper limit value (e.g., 8000 rpm), as can be seen from the contents of the conditions S33, S34.

However, as shown in FIG. 5, the first upper limit value is set to a value between the first rotational speed and the second rotational speed, namely, in a range in which the limit value of the throttle valve opening degree tends to be decreased monotonously. For this reason, even when the rotational speed is decreased from the first upper limit value, the throttle valve opening degree is limited less (a is increased), and hence the throttle valve opening degree is compensated to be increased. Therefore, even when the rotational speed is decreased upon the initiation of the connected state of the drive system, the output can be restored quickly in response to this decrease. It should be noted that the output control system 100 may also reduce the fuel reducing ratio, increase the fuel injection amount, and advance the ignition timing, in order to increase the rotational speed toward the second upper limit value, concurrently with the compensation for increasing the throttle valve opening degree.

The state determiner section 44 can determine that the connected state of the drive system is initiated, before the drive wheel 4 actually begins to rotate. For this reason, even when the connected state of the drive system is initiated before the driving power is transmitted to the drive wheel 4, the output of the driving source 2 can be increased around the time when the drive wheel 4 actually begins to rotate.

After that, for a time period that passes until the vehicle speed reaches one corresponding to the second upper limit value in the engaged state of the clutch, the upper limit value of the output is maintained at the second upper limit value (S41, S42). This makes it possible to suppress an increase/decrease in the output of the drive source 2 while the rider is operating the clutch operation unit 21. Thus, the rider can engage the clutch with a simple clutch operation without generating an impact.

The output control system 100 controls the throttle valve 11 so that the throttle valve opening degree and hence the air-intake amount are increased according to the output command and the rotational speed. This makes it possible to smoothly change the output of the drive source 2 after the vehicle has begun to move.

When the vehicle speed reaches one corresponding to the second upper limit value in the engaged state of the clutch, the upper limit setting section 45 substantially ceases to set the upper limit value (S51). The phrase "the upper limit setting section 45 substantially ceases to set the upper limit value" includes a case where the upper limit value is eliminated, and a case where the upper limit value is increased with a great increase rate at which an actual engine behavior is not virtually limited. Even when the upper limit setting section 45 substantially ceases to set the upper limit value, the excess rotation limit value continues to be still set. Therefore, the rotational speed continues to be controlled to protect the drive source 2, after the clutch has been engaged. When the upper limit setting section 45 ceases to set the upper limit value, the injector command setting section 42 sets the fuel reducing ratio to zero, and thus the fuel reduction in the starting control is terminated. On the other hand, the starting control is not terminated. Therefore, even in a sate in which the upper limit setting section 45 has ceased to set the upper limit value, the opening degree limiting control with reference to the characteristic conversion map for the starting mode is continued, and the throttle valve opening degree is limited according to the rotational speed. After the upper limit setting section 45 has substantially ceased to set the upper limit value, the output and the rotational speed are increased, and thereby the vehicle speed is increased. The rider performs a shift-up operation in succession, to select a transmission gear ratio corresponding to the vehicle speed. When a condition in which the vehicle speed is equal to or higher than a predetermined value (S52) and a condition in which the gear position is equal to or greater than a predetermined value (S53) are met, the starting control is terminated. Alternatively, the starting control may be terminated when the condition S52 or the condition S53 is met.

(Advantage)

The above-described starting control will be described in conjunction with the perspective of the rider. In a case where the rider wishes to initiate the starting control, the rider may operate in advance the permission/inhibition switch 37 to permit the starting control to be performed, disengage the clutch and operate the output operation unit 23 to place the accelerator at the fully open position while the vehicle is stopped, and maintain this operation state for a predetermined time period. When the predetermined time period passes, the rotational speed is decreased rapidly and is set to a statically determinate value in a predetermined range (the first upper limit range) including the first upper limit value. Even when the output operation unit 23 is maintained at a predetermined value or more, precisely, the accelerator is maintained at the fully open position, in a state in which the clutch is disengaged and the vehicle is stopped, the rotational speed of the drive source 2 does not exceed the first upper limit range again. Based on the rapid decrease in the rotational speed and setting of the rotational speed to the statically determinate value, the rider can recognize that the starting control has been initiated normally.

If the rider wishes to actually initiate staring of the vehicle, it is sufficient that the rider causes the transmission 17 to be in the gear-in state by selecting, for example, a first gear position, operates the output operation unit 23 to maintain the accelerator at the fully open position, and begin to return the operation position of the clutch operation unit 21 toward the original position. In the state in which the accelerator is at the fully open position, the throttle valve opening degree becomes the limit value derived from the graph of FIG. 5, and changes according to the vehicle speed as indicated by the graph, as described above.

When the clutch device 16 begins to transmit the driving power, and thereby the rotational speed of the drive source 2 is decreased, the output of the drive source 2 is automatically adjusted, for example, by performing a compensation for increasing the throttle valve opening degree. In this way, the rotational speed of the drive source 2 can be restored quickly. If the rider incorrectly operates the clutch operation unit 21, and thereby the clutch device 16 is engaged rapidly, then there is a time lag from when the clutch device 16 begins to transmit the driving power, namely, the rotational speed of the drive source 2 begins to be decreased until the driving power for traction of the vehicle, namely, the driving power for rotating the drive wheel 4 and starting the vehicle is transmitted to the drive wheel 4. Since it can be detected that the clutch device 16 begins to transmit the driving power before starting of the vehicle is initiated, the output of the drive source 2 can be adjusted, and a situation in which the drive source 2 outputs maximum torque can be restored quickly, for the time lag.

The rider can focus on the clutch operation while maintaining the output operation unit 23 at the fully open position. During that time period, the output control system 100 automatically adjusts the output and rotational speed of the drive source 2 so that the maximum torque can be generated based on the output command and the rotational speed. After starting of the vehicle is initiated, the rotational speed of the drive source 2 is maintained at the second upper limit value. For a time period for which the clutch device 16 is shifted from the slip state to the engaged state, namely, a time period for which the driving power transmission ratio is being increased, the rotational speed is constant, and therefore, the rider can easily perform the clutch operation.

When the vehicle speed reaches one corresponding to the second upper limit value in the engaged state of the clutch, the upper limit setting section 45 substantially ceases to set the upper limit value of the rotational speed. However, the starting control is not terminated, and the throttle valve opening degree continues to be limited. Therefore, the output of the drive source 2 can be increased smoothly in a state in which the throttle valve opening degree is limited. This allows the vehicle to be accelerated while suppressing occurrence of the slip or the wheelie around the time when the clutch device 16 is engaged. After that, the rider may perform a gearshift operation depending on the vehicle speed, and thus, the starting control is automatically terminated depending on the gear position and/or the vehicle speed. Thereby, the characteristic conversion map 51 is shifted from one which imposes a limitation on the throttle valve opening degree to one in a different mode.

(Address Occurrence of Wheelie)

However, in a case where the rider incorrectly operates the clutch operation unit 21, and thereby the clutch device 16 is engaged rapidly, the drive wheel 4 may be excessively accelerated and the wheelie may occur. To avoid this, during the starting control, the wheelie determiner section 46 determines whether or not the wheelie is occurring in the vehicle.

The wheelie determiner section 46 determines whether or not the wheelie is occurring in the vehicle, based on the pitch angle. This allows the wheelie determiner section 46 to easily determine whether or not the wheelie is occurring in the vehicle. In a case where the pitch angle detector 37 is a gyro sensor, a change in a road surface slope may cause a noise and a detection accuracy of the pitch angle may be degraded, while the vehicle is traveling. However, by calculating a change in the pitch angle from when starting of the vehicle is initiated, an accumulated noise can be eliminated, and a lift-off amount of the front wheel 1a from the ground can be detected easily and accurately. Further, in a case where the pitch angle is used as a determination parameter, occurrence of the wheelie can be determined accurately even in a situation in which the wheel is not rotating or the rotational speed of the drive source 2 is not high. This is suitable to determination of occurrence of the wheelie during the starting control. When the wheelie determiner section 46 determines that the wheelie is occurring in the vehicle, the output control system 100 performs a wheelie control for suppressing the output of the drive source 2 to suppress occurrence of the wheelie, while performing the starting control.

This will be described specifically. Turning back to FIG. 3, when the wheelie determiner section 46 determines that the wheelie is occurring in the vehicle, the opening degree command section 41 derives the opening degree limiting coefficient $\beta$ used to suppress the wheelie, with reference to an opening degree limiting map 52. The opening degree command section 41 may derive the opening degree limiting coefficient $\beta$, based on the pitch angle, as shown in FIG. 3. However, this is merely exemplary, and the opening degree command section 41 may derive the opening degree limiting coefficient $\beta$, based on other driving states such as a speed difference between the front and rear wheels 1a, 1b, the throttle valve opening degree, the rotational speed of the drive source 2, or time that passes from when the wheelie has begun.

In any case, the opening degree limiting coefficient $\beta$ is a value smaller than 1. The throttle valve opening degree is further reduced by imposing a limitation using the characteristic conversion coefficient $\alpha$. In this way, the output of the drive source 2 can be suppressed for a situation in which the wheelie is occurring while the vehicle is started rapidly. As a result, the wheelie can be suppressed at an earlier stage.

As can be seen from FIG. 3, the opening degree limiting coefficient $\beta$ is used to compensate the base value derived using the characteristic conversion coefficient $\alpha$ selected according to the traveling mode. The opening degree limiting coefficient $\beta$ can be derived irrespective of the traveling mode. In brief, the opening degree limiting map 52 used to derive the opening degree limiting coefficient $\beta$ is common to a case where the starting control is not selected and a case where the starting control is selected. Therefore, if the wheelie is occurring in the vehicle while the vehicle is traveling in the normal traveling mode, the base value derived with reference to the characteristic conversion map for the normal traveling mode is compensated by the opening degree limiting coefficient $\beta$ derived as in the case of the starting control. Thus, since the compensation coefficient (the opening degree limiting coefficient $\beta$) used to suppress the wheelie can be derived independently of the traveling mode, a control logic can be simplified. The base value to be compensated reflects a scene in which the vehicle travels or the rider's driving skill. Since the characteristic of the final target value of the throttle valve opening degree is decided without ignoring the base value, the output of the drive source 2 can be suppressed to be adapted to a traveling situation.

(Other Embodiment)

The embodiment has been described so far. The above-described configuration is merely exemplary, and can be added, deleted, or changed within the scope of the invention.

It is sufficient that the output control system 100 is able to increase the output of the drive source 2 at a time point when at least the connected state of the drive system is initiated, and thereby the rotational speed can be restored early. It is not necessary to maintain the upper limit value at the second upper limit value over a time period from when the connected state of the drive system is initiated until when the state determiner section 44 determines that the clutch device 16 is engaged, namely, a time period for which the state determiner section 44 is determining that the clutch device 16 is in the slip state. For example, even for a time period for which the clutch device 16 is in the slip state, the upper limit value may be returned to the first upper limit value if the rotational speed of the drive source 2 is restored to a value that is close to the first upper limit value.

Further, in a case where the transmission 17 is in the gear-in state and the gear position becomes one other than a lowest gear position, namely, the rider performs a shift-up operation, the upper limit setting section 45 may substantially cease to set the second upper limit value, even in a state in which the clutch device 16 is in the slip state.

As described above, the clutch device 16 is configured to change the driving power transmission ratio. The opening degree command section 41 may control the throttle valve 11 in such a manner that the throttle valve opening degree, namely, the air-intake amount is changed according to the driving power transmission ratio. The throttle valve opening degree and the air-intake amount have a continuity compared to the fuel reducing ratio and the ignition reducing ratio. For this reason, the throttle valve opening degree and the air-intake amount are suitably used to finely adjust the output of the drive source 2. Thus, the driving power to be generated in the drive source 2 can be changed smoothly according to a change over time of the driving power transmission ratio. The output control system is applicable to a vehicle other than the motorcycle.

The invention claimed is:

1. An output control system incorporated in a vehicle including a clutch device which shifts a drive system from a no-load state in which a driving power transmission path provided between a drive source and a drive wheel is cut off to a connected state in which the driving power transmission path is connected, the output control system comprising:
    an upper limit setting section which sets an upper limit value of an output of the drive source while the output control system is performing a starting control; and
    a state determiner section which determines a state of the drive system while the output control system is performing the starting control, wherein the upper limit setting section sets the upper limit value to a first upper limit value, while the state determiner section is determining that the drive system is in the no-load state, and wherein the upper limit setting section sets the upper limit value to a second upper limit value larger than the first upper limit value, when the state determiner section determines that the connected state of the drive system is initiated.

2. The output control system according to claim 1,
wherein the state determiner section determines that the connected state of the drive system is initiated, when a reduction amount of a rotational speed of the drive source per unit time becomes equal to or greater than a first predetermined value, in a state in which the output of the drive source is maintained within a first upper limit range including the first upper limit value.

3. The output control system according to claim 2,
wherein the state determiner section determines that the connected state of the drive system is initiated, when the reduction amount of the output of the drive source per unit time is equal to or greater than the first predetermined value, and a reduction amount of an output command per unit time is less than a second predetermined value, the output command being input by a rider.

4. The output control system according to claim 1,
wherein the upper limit setting section substantially ceases to set the upper limit value, when the state determiner section determines that a vehicle speed becomes one corresponding to the second upper limit value in a state in which the clutch device is engaged.

5. The output control system according to claim 1,
wherein the clutch device is configured to change a ratio of the driving power transmitted to the drive wheel with respect to the driving power transmitted from the drive source, and wherein the upper limit setting section maintains the upper limit value at the second upper limit value until the ratio becomes a predetermined maximum ratio.

6. The output control system according to claim 1, comprising:
a transmission included in the driving power transmission path,
wherein the upper limit setting section substantially ceases to set the second upper limit value, when a gear position of the transmission is other than a lowest gear position.

7. The output control system according to claim 1,
wherein the drive source is an engine, and the clutch device is configured to change a ratio of the driving power transmitted to the drive wheel with respect to the driving power transmitted from the engine, and wherein an amount of intake air to be supplied to the engine is controlled according to the ratio.

* * * * *